US009887868B2

(12) United States Patent
Kasher

(10) Patent No.: US 9,887,868 B2
(45) Date of Patent: Feb. 6, 2018

(54) TECHNIQUES USING A FIRST BAND OF COMMUNICATION TO DETERMINE FREQUENCY SYNCHRONIZATION FOR COMMUNICATION ON A SECOND BAND

(71) Applicant: INTEL IP CORPORATION, Santa Clara, CA (US)

(72) Inventor: Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 206 days.

(21) Appl. No.: 14/750,390

(22) Filed: Jun. 25, 2015

(65) Prior Publication Data

US 2016/0381685 A1  Dec. 29, 2016

(51) Int. Cl.
*H04L 27/26* (2006.01)

(52) U.S. Cl.
CPC ................. *H04L 27/2657* (2013.01)

(58) Field of Classification Search
CPC ............ H04W 72/0453; H04L 27/2657
USPC ........................................................ 370/329
See application file for complete search history.

(56) References Cited

U.S. PATENT DOCUMENTS

| 7,720,131 | B2 | 5/2010 | Srivastava et al. | |
| 8,483,298 | B2 | 7/2013 | Ko et al. | |
| 8,923,467 | B2* | 12/2014 | Lee | H03L 7/07 375/340 |
| 9,603,110 | B2* | 3/2017 | Chakraborty | H04W 88/06 |
| 2004/0067741 | A1 | 4/2004 | Fei et al. | |
| 2007/0133658 | A1* | 6/2007 | Shin | H04B 1/7143 375/131 |
| 2007/0298733 | A1* | 12/2007 | Cole | H04B 17/101 455/114.2 |
| 2008/0101520 | A1* | 5/2008 | Huang | H04L 27/2656 375/371 |
| 2009/0011722 | A1* | 1/2009 | Kleider | H04B 1/59 455/101 |
| 2010/0135238 | A1* | 6/2010 | Sadri | H04W 72/0453 370/329 |
| 2012/0093039 | A1* | 4/2012 | Rofougaran | H04J 1/00 370/278 |
| 2012/0243638 | A1* | 9/2012 | Maltsev | H04W 72/0453 375/316 |
| 2012/0250750 | A1* | 10/2012 | Mishra | H04L 27/0014 375/226 |

(Continued)

FOREIGN PATENT DOCUMENTS

KR  10-2013-0010578  1/2013

OTHER PUBLICATIONS

International Search Report and Written Opinion received for PCT Patent Application No. PCT/US2016/034168, dated Aug. 31, 2016, 12 pages.

*Primary Examiner* — Asad Nawaz
*Assistant Examiner* — Saad A Waqas

(57) ABSTRACT

Various embodiments are generally directed to an apparatus, method and other techniques to determine a first frequency offset for a first band of communication based on one or more packets communicated by a first transceiver, determine a second frequency offset for a second band of communication based on the first frequency offset, and process one or more packets of information communicated on the second band of communication via a second transceiver based on the second frequency offset.

21 Claims, 11 Drawing Sheets

(56) References Cited

U.S. PATENT DOCUMENTS

| | | | |
|---|---|---|---|
| 2013/0003709 A1* | 1/2013 | Kalhan | H04W 76/025 370/338 |
| 2013/0229996 A1* | 9/2013 | Wang | H04W 72/0413 370/329 |
| 2014/0315568 A1* | 10/2014 | Liu | H04W 88/06 455/452.2 |
| 2015/0016246 A1 | 1/2015 | Morita et al. | |
| 2015/0249534 A1* | 9/2015 | Sundstrom | H04B 1/0067 455/77 |
| 2016/0295535 A1* | 10/2016 | Jose | H04L 7/0037 |

* cited by examiner

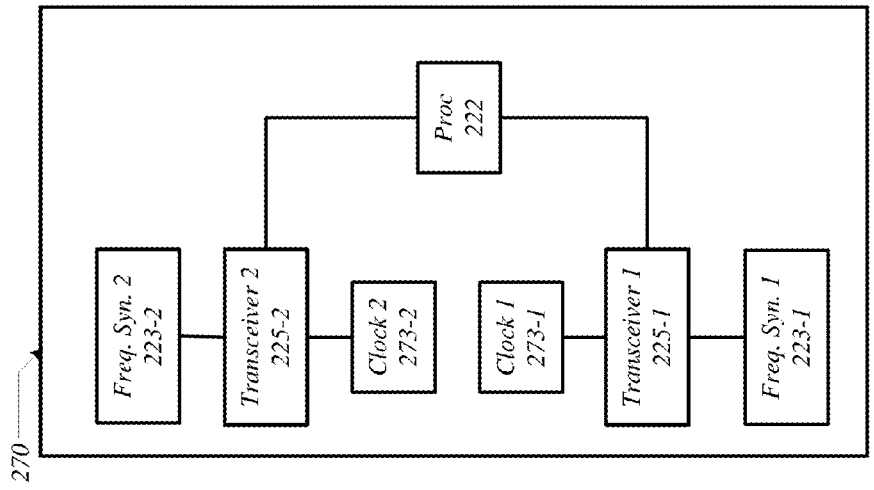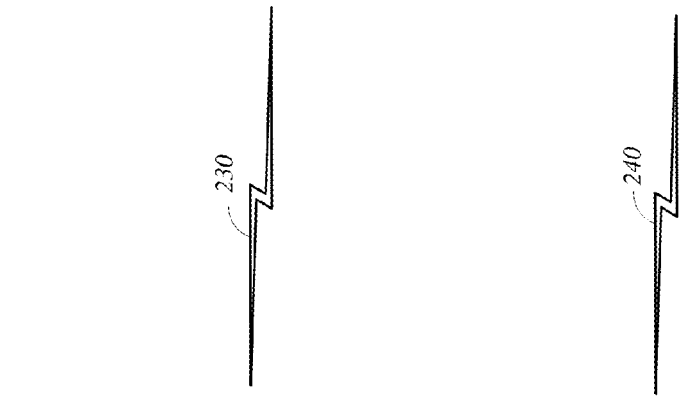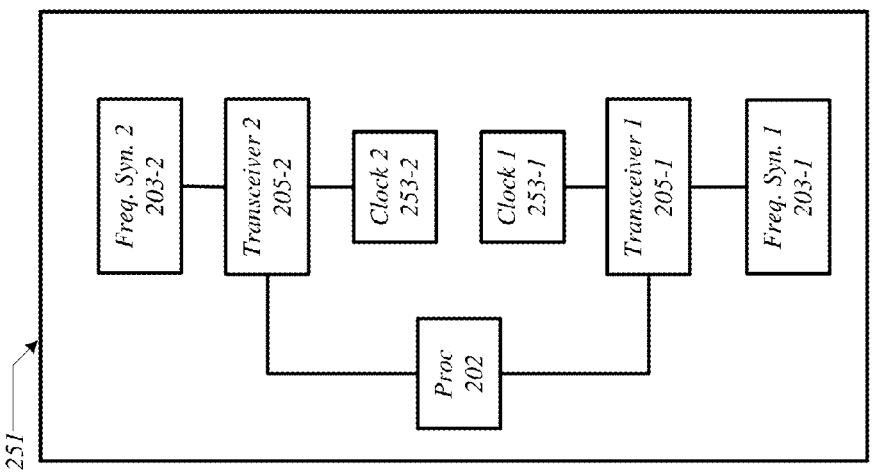
FIG. 2B

500

DETERMINE A FIRST FREQUENCY OFFSET FOR A FIRST BAND OF COMMUNICATION BASED ON ONE OR MORE PACKETS COMMUNICATED BY A FIRST TRANSCEIVER
505

DETERMINE A SECOND FREQUENCY OFFSET FOR A SECOND BAND OF COMMUNICATION BASED ON THE FIRST FREQUENCY OFFSET
510

PROCESS ONE OR MORE PACKETS OF INFORMATION COMMUNICATED ON THE SECOND BAND OF COMMUNICATION VIA A SECOND TRANSCEIVER BASED ON THE SECOND FREQUENCY OFFSET
515

TECHNIQUES USING A FIRST BAND OF COMMUNICATION TO DETERMINE FREQUENCY SYNCHRONIZATION FOR COMMUNICATION ON A SECOND BAND

TECHNICAL FIELD

Embodiments described herein generally relate techniques determine a frequency offset. More specifically, embodiments include determine a frequency a second band of communication based on communication on a first band of communication.

BACKGROUND

Wireless communication systems communicate information over a shared wireless communication medium such as one or more portions of the radio-frequency (RF) spectrum. Recent innovations in Millimeter-Wave (mmWave) communications operating at the 60 Gigahertz (GHz) frequency band promises several Gigabits-per-second (Gbps) throughput. The next generation 60 GHz standard may be applied to new applications, such as outdoor access and backhaul. These new applications may require longer ranges, e.g. 100 meters (m), than what is currently being used. These longer ranges may require larger antenna arrays with higher gains. In order to perform beamforming training algorithms for these longer ranges longer training sequences may be required. However, longer training sequences may be undesirable.

BRIEF DESCRIPTION OF THE DRAWINGS

FIG. 2B illustrates an example embodiment of third computing system.

FIG. 5 illustrates an example embodiment of a second logic flow diagram.

DETAILED DESCRIPTION

Figure 1:
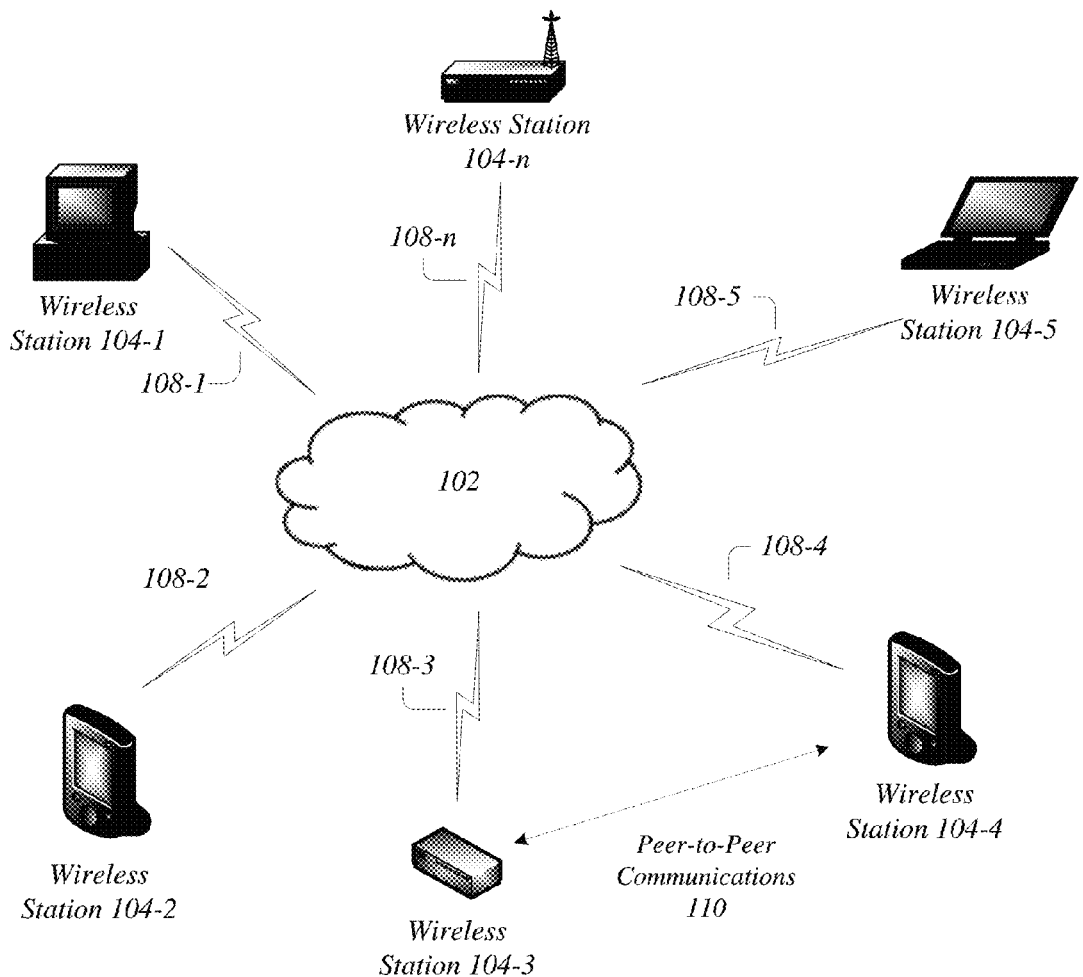
FIG. 1 illustrates an example embodiment of a first computing system.

Various embodiments are generally directed to techniques for operation in accordance with one or more specification, standards or variants suitable for wireless communications. For example, various embodiments may include communications in and around the 60 Gigahertz (GHz) frequency band as defined by Wireless Gigabit Alliance Wireless Gigabit ("WiGig") Specification Version 1.0, according to Institute of Electrical and Electronics Engineers (IEEE) Standard 802.11ad-2012, published December 2012, titled "Amendment 3: Enhancements for Very High Throughput in the 60 GHz Band," ("IEEE 802.11ad-2012") or according to any predecessors, revisions, or variants thereof (collectively, "WiGig/802.11ad Standards"); one or more of the WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations. Further, some embodiments may be directed for operation in accordance with the next generation (NG) 60 GHz communication standard, such as IEEE 802.11ay Next Generation 60 GHz (hereinafter "NG60") or any other wireless standards as promulgated by other standards organizations. Various embodiments are not limited in this manner.

Moreover, embodiments may be directed to Wi-Fi communications in and around the 2.4 GHz and 5 GHz frequency bands. These Wi-Fi communications may be in accordance with one or more standards, such as any one of the IEEE 802.11 standards including, but not limited to, IEEE 802.11a, 802.11b, 802.11g, 802.11n, 802.11ac, 802.11 ax, and other derivatives of these standards (collectively, "Wi-Fi Standards).

Some embodiments may include systems, apparatus, devices, and so forth capable of operating in any number of frequency bands. For example, various embodiments may include one or more devices having a first transceiver capable of operating and communicating in a lower frequency band such as the 2.4 GHz frequency band and/or the 5 GHz frequency band. In addition, these devices may include a second transceiver capable of operating in a higher frequency band such as the 60 GHz frequency band. In some embodiments, the first and second transceivers may be the same transceiver. Various embodiments are not limited in this manner and in some embodiments, the first and second transceivers may be separate devices or transceivers.

Embodiments may include determining a frequency offset for a lower band of communication based on one or more packets communicated between devices. For example, a transceiver of a device may receive any number of packets from another device on a lower frequency band. A frequency offset may be determined between the devices based on measurements made at the receiving transceiver's wireless station.

The frequency offset determined from the communication on the lower band of communication may be used to determine another frequency offset for a higher band of communication, as described in more detail below. In some embodiments, the higher band of communication may then be used to communicate based on the other frequency offset determined without using longer training sequences while performing beamforming operations. These and other details will become more apparent with the following description.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram of one embodiment of a communications system 100. In various embodiments, the communications system 100 may include multiple stations or devices. A station generally may include any physical or logical entity for communicating information in the communications system 100 and may be implemented as hardware, software, or any combination thereof, as desired for a given set of design parameters or performance constraints. Although FIG. 1 may show a limited number of stations by way of example, it can be appreciated that more or less stations may be employed for a given implementation.

In various embodiments, the communications system 100 may include, or form part of a wired communications system, a wireless communications system, or a combination of both. For example, the communications system 100 may include one or more stations arranged to communicate information over one or more types of wired communication links. Examples of a wired communication link, may include, without limitation, a wire, cable, bus, printed circuit board (PCB), Ethernet connection, peer-to-peer (PTP) connection, backplane, switch fabric, semiconductor material, twisted-pair wire, co-axial cable, fiber optic connection, and so forth. The communications system 100 also may include one or more stations arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices including part of the communications system 100 may be arranged to operate in accordance with any specification or standards, such as the WiGig/802.11ad Standards, Wi-Fi Standards, NG60 Standard, and so forth.

Further, the communications system 100 may communicate, manage, or process information in accordance with one or more protocols. A protocol may include a set of pre-defined rules or instructions for managing communication among stations. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. The embodiments are not limited in this context.

As shown in FIG. 1, the communications system 100 may include a network 102 and a plurality of wireless stations 104-n, where n may represent any positive integer value. In various embodiments, the wireless stations 104-n may be implemented as various types of wireless devices. Examples of wireless devices may include, without limitation, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, media server, digital music player, set-top box (STB), appliance, workstation, user terminal, mobile unit, consumer electronics, television, digital television, high-definition television, television receiver, high-definition television receiver, and so forth. In the illustrated embodiment shown in FIG. 1, the wireless stations 104-n may include a PC 104-1, a digital TV 104-2, a media source 104-3 (e.g., a CD, DVD, media file server, etc.), a handheld device 104-4, and a laptop or notebook 104-5. These are merely a few examples, and the embodiments are not limited in this context.

In some embodiments, the wireless stations 104-n may include one more wireless interfaces and/or components for wireless communication such as one or more transmitters, receivers, transceivers, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a microstrip antenna, a diversity antenna, a dual antenna, an antenna array, and so forth.

In various embodiments, the wireless stations 104-n may include or form part of a wireless network 102. More specifically, the wireless stations 104-n may be directional multi-gigabit (DMG) stations (STAs) operative to communicate over wireless network 102 according to one or more standards. Although some embodiments may be described with the wireless network 102 implemented as 60 GHz wireless network for purposes of illustration, and not limitation, it can be appreciated that the embodiments are not limited in this context. For example, the wireless network 102 may include or be implemented as various types of wireless networks and associated protocols suitable for a WVAN, WPAN, WLAN, WMAN, Wireless Wide Area Network (WWAN), Broadband Wireless Access (BWA) network, a radio network, a cellular radiotelephone network, a cable network, a television network, a satellite network such as a direct broadcast satellite (DBS) network, and/or any other wireless communications network configured to operate in accordance with the described embodiments.

In some embodiments, the wireless network 102 may support dual-band communication. For example, various embodiments may include wireless stations 104-n communicating via a first band of communication and a second band of communication with other wireless stations 104-n. The first band of communication may be a lower band of communication, such as the 2.4 GHz and/or 5 GHz band of communication, and the second band of communication may be a higher band of communication, such as the 60 GHz. For example, various embodiments may include determining a frequency offset between clocks or crystal oscillators on first and second stations based on communications on a lower band of communication and using the determined frequency offset to enable communication on the higher band of communication. In another example, the frequency offset determined using the lower band of communication may be used to adjust a frequency synthesizer for a transceiver to communicate on a higher band of communication. These and other details will become more apparent in the following description.

The network 102 allows for peer-to-peer or ad hoc network communications 110 where the wireless stations 104-n may communicate directly with each other without necessarily needing a fixed device, such as a wireless access point. In embodiments, for example, the network 102 provides for contention-based medium access, such as carrier sense multiple access (CSMA) technique, often combined with a collision avoidance (CA) technique for wireless networks (CSMA/CA). The CSMA/CA technique is intended to provide fair and equal access to the wireless stations 104-n, where each wireless station 104-n listens to the wireless shared medium before attempting to communicate. To accommodate bandwidth demanding and time-sensitive information, such as audio/video (AV) or multimedia streams, the network 102 may implement QoS techniques to implement controlled fairness. Traffic having a higher priority is given preferential access to the wireless shared medium, for example. Various embodiments are not limited to the above-recited examples and other configurations may be contemplated.

Figure 2A:
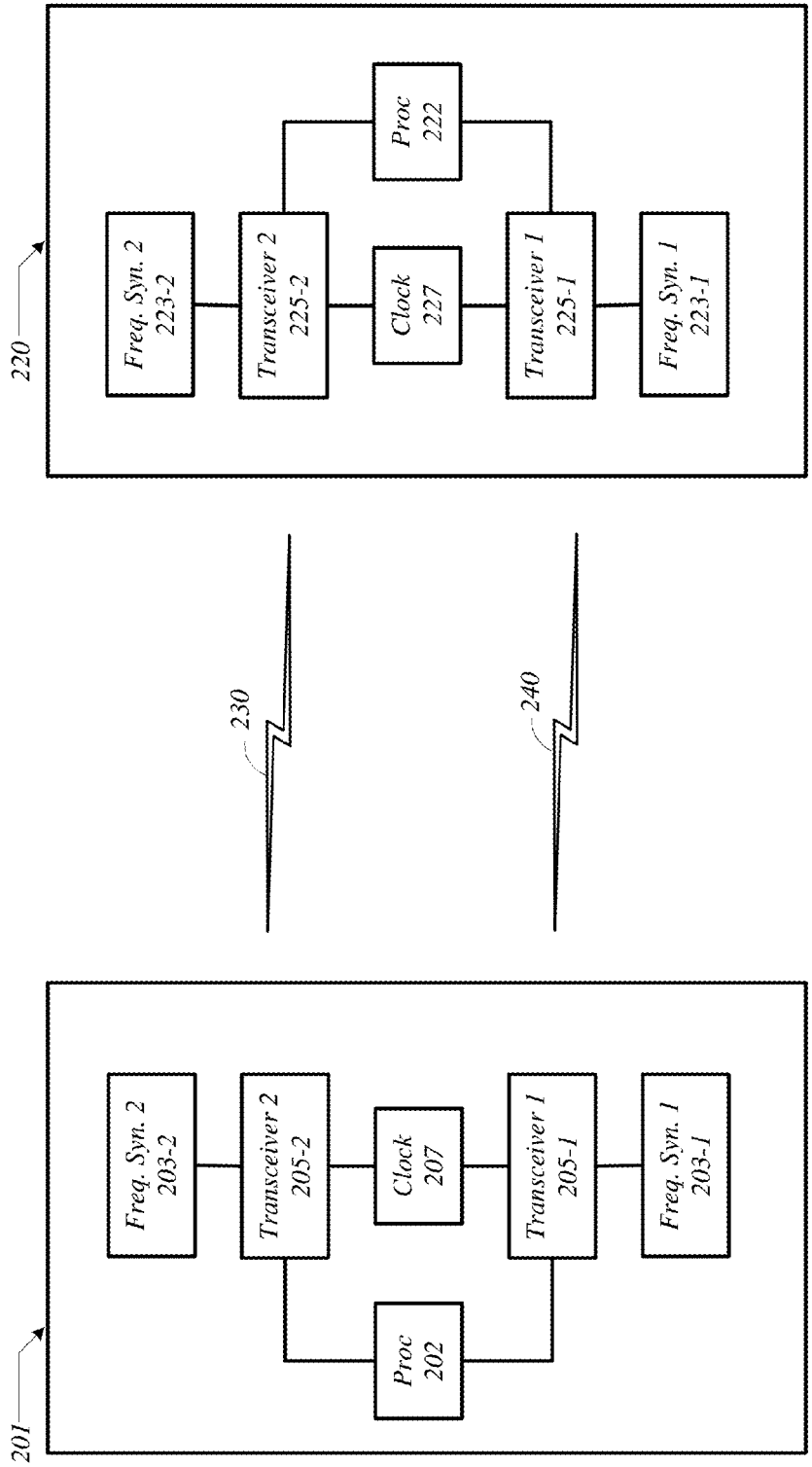
FIG. 2A illustrates an example embodiment of a second computing system.

FIG. 2A illustrates an example embodiment of computing system 200 having stations 201 and 220. In embodiments, computing system 200 and stations 201 and 220 may operate in accordance of one or more standards, such as the WiGig/802.11ad Standards, the Wi-Fi Standards, and NG60 as previously discussed above in FIG. 1. In some embodiments, station 201 may be any type of device or station including a wireless device, computing device, PDA, and so forth, and the station 220 may be an access point (AP) capable of communicating with any number of devices and allows wireless stations to connect to a wired network. For example, the AP usually connects to a router (via a wired network) as a standalone device, but it can also be an integral component of the router itself. The AP may allow wireless stations to connect to the Internet and other wired or wireless networks.

In some embodiments, the wireless stations 201 and 220 may include a number of components which may be implemented in hardware only, software only, or some combination of hardware and software. The components of wireless station 201 may include a processor 202, a first transceiver 205-1 coupled with a first frequency synthesizer 203-1 and a clock 207. The wireless station 201 may also include a second transceiver 205-2 coupled with a second frequency synthesizer 203-2 and the clock 207. Similarly, wireless station 220 may also including components, such as processor 222, a first transceiver 225-1 coupled with a first synthesizer 223-1 and a clock 227. In addition, the wireless station 220 may include a second transceiver 225-2 coupled with a second synthesizer 223-2 and the clock 227. Although FIG. 2A illustrates wireless stations 201 and 220 having a limited number of components, various embodiments are not limited in this manner.

In embodiments, the wireless stations 201 and 220 may communicate with each other wirelessly using one or more wireless links, such as wireless links 230 and 240. In some embodiments, the wireless station 201 may use the first transceiver 205-1 to communicate on a lower band (e.g. 2.4 GHz and/or 5 GHz) via wireless link 240 with a first transceiver 225-1 of wireless station 220. Further, the wireless station 201 may use the second transceiver 205-2 to communicate on a higher band (60 GHz) via wireless link 230 with a second transceiver 225-2 of the wireless station 220. However, various embodiments are not limited in this manner. For example, the first transceivers 205-1 and 225-1 may communicate on a higher band of communication, and the second transceivers 205-2 and 225-2 may communicate on a lower band of communication. Further and in some embodiments, the first and second transceivers 201 and 220 of each of the wireless stations 201 and 220 may be the same transceiver capable of operating on different frequency bands, such as a lower frequency band and a higher frequency band. Various embodiments are not limited in this manner.

In some embodiments, the processors 202 and 222 may be any type of circuitry capable of processing information, data and communications including one or more processors, for example, a Central Processing Unit (CPU), a Digital Signal Processor (DSP), a microprocessor, a controller, a chip, a microchip, an Integrated Circuit (IC), or any other suitable multi-purpose or specific processor or controller. Processors 202 and 222 may, for example, process data and information for transmission between devices 201 and 220.

As mentioned, the wireless stations 201 and 220 may include any number of transceivers, such as the first and second transceivers 205-1, 205-2 of wireless station 201 and the first and second transceivers 225-1, 225-2 of wireless station 220. Each of the transceivers 205-1, 205-2, 225-1 and 225-2 may include both a transmitter and a receiver. The transmitter may send information and data in packets and/or frames and the receiver may receive information and data in packets and/or frames. In addition, the transceivers 205-1, 205-2, 225-1 and 225-2 may be capable of communicating radio frequency (RF) transmissions and may be able to down-convert received RF signals and up-convert RF signals to send. In some embodiments, each of the transceivers 205-1, 205-2, 225-1 and 225-2 may be coupled with one or more antennas (not shown). For example, one or more antennas may be shared between the first and second transceivers 205-1 and 205-2 on the wireless station 201. In another example, one or more antennas may be shared between the first and second transceivers 225-1 and 225-2 on the wireless station 220. Various embodiments are not limited in this manner each transceiver may be coupled with a dedicated antenna.

Further, the transceivers of the wireless stations 201 and 220 may communicate on different frequency bands. For example, the first transceiver 205-1 of wireless station 201 may communicate on a first frequency band with the first transceiver 225-1 of wireless station 220. The second transceiver 205-2 of wireless station 201 may communication on a second frequency band, different (or the same) as the first frequency band, with the second transceiver 225-2 of wireless station 220. In embodiments, the first frequency band may be a lower frequency band (2.4 GHz and/or 5 GHz) and the second frequency band may be a higher frequency band (60 GHz). Various embodiments are not limited to this example.

In embodiments, each of the transceivers may be coupled with other components. For example, the first transceiver 205-1 may be coupled with a first synthesizer 203-1 and the second transceiver 205-2 may be coupled with a second synthesizer 203-2. Each of the frequency synthesizers 203-1 and 203-2 may produce a desired output signal for their respective transceivers 205-1 and 205-2. More specifically, the frequency synthesizers 203-1 and 203-2 may generate an output signal in response to a reference signal and may be a phase-locked loop. In addition, the frequency synthesizers 203-1 and 203-2 may be used for, among other things, frequency synthesis, frequency multiplication, pulse synchronization, tone decoding, AM and FM modulation and demodulation, and phase modulation and demodulation. Further, each of frequency synthesizers 203-1 and 203-2 may include other components or functional elements that are not shown for simplicity purposes.

Similarly, wireless station 220 may also include a first synthesizer 223-1 coupled with a first transceiver 225-1 and a second synthesizer 223-2 coupled with a second transceiver 225-2. The first synthesizer 223-1 and 223-2 may operate in a similar or same manner as described above including providing a desired output signal. Moreover, the first and second synthesizers 223-1 and 223-2 generate an output signal in response to a reference signal and may be a phase-locked loop. In addition, the frequency synthesizers 223-1 and 223-2 may be used for, among other things, frequency synthesis, frequency multiplication, pulse synchronization, tone decoding, AM and FM modulation and demodulation, and phase modulation and demodulation.

In embodiments, each of the wireless stations 201 and 220 may include a clock or crystal oscillator. For example, wireless station 201 may include a clock 207 coupled with the first and second transceivers 205-1 and 205-2 and wireless station 220 may include a clock 227 coupled with first and second transceivers 225-1 and 225-2. Each of the clocks 207 and 227 may provide a reference clock input signal for the transceivers 205-1, 205-2, 225-1 and 225-2. More specifically, clock 207 may provide a reference clock signal for transceivers 205-1 and 205-2 causing them to be frequency locked since they are sharing the same reference signal. Similarly, clock 227 may provide the same reference clock signal to transceivers 225-1 and 225-2 causing them to be frequency locked. Although not shown, each of the clocks 207 and 227 may provide reference signals to other components and circuitry of the wireless stations 201 and 220. For example, clock 207 may provide a reference clock signal to processor 202 and clock 227 may provide a reference clock signal to processor 222. Various embodiments are not limited in this manner.

In various embodiments, the use of a common clock between the transceivers on at least one of the wireless stations 201 and 220 may enable the wireless stations 201 and 220 to determine a frequency offset between transceivers communicating on a first frequency band and then use the determined frequency offset to communicate on a second frequency band. For example, the first transceiver 205-1 and 225-1 may communicate on a lower frequency, such as the 2.4 GHz and/or 5 GHz band. Circuitry, such as processors 202 and 222, on each of the stations may be used to determine a frequency offset between signals communicated by the first transceiver 205-1 based on a reference signal generated by clock 207 and by the first transceiver 225-1 based on a reference signal generated by clock 227. In some embodiments, the frequency offset may be measured or determined based on the packets communicated by the first transceivers 205-1 and 225-1.

The determined frequency offset for the lower band communication may be used in the communication between the second transceivers 205-2 and 225-2 on a higher band of communication. More specifically and in some embodiments, equation 1 below may be used to determine a frequency offset for the higher band communication:

$$f_{off_H} = \frac{f_{off_L} * f_{C_H}}{f_{C_L}}, \quad (1)$$

where $f_{off_H}$ is the frequency offset in the higher band of communication, $f_{off_L}$ is the frequency offset in the lower band of communication, $f_{C_H}$ is the carrier frequency in the higher band of communication, and $f_{C_L}$ is the carrier frequency in the lower band of communication.

In the above-discussed example, one or more packets may be communicated in the lower frequency band, such as 2.4 GHz and/or 5 GHz, and the frequency offset in the lower band may be measured or calculated based on the communicated packets. The frequency offset in the lower band, along with carrier frequencies for the lower and higher bands may be used to determine the frequency offset in the higher band of communication, as shown in equation 1.

Circuitry on either or both of the wireless stations 201 and 220 may use the frequency offset for the higher band of communication to communicate packets on the higher band of communication. For example, circuitry may process information or data in packets by multiplying a signal by an offset adjustment sequence $$e^{-j2\pi \frac{f_{off_H}}{f_{samp_H}} n},$$

where $f_{off_H}$ is the frequency offset for the higher band of communication and $f_{samp_H}$ is the sampling frequency for the higher band of communication. As previously mentioned, the frequency offset in the higher band of communication may be determined from and based on the frequency offset in the lower band of communication as illustrated in equation 1. The offset adjustment sequence may then be applied or multiplied to signals to process information and data in packets. By using the frequency offset in the lower band of communication to determine the offset frequency in the higher band of communication, longer beamforming training sequences can be used for the higher band of communication which typically uses directional communication. Further, better reception of higher band control PHY frames or packets may be realized.

Further, the frequency offset in the lower band of communication may also be used to adjust the frequency synthesizer used in the higher band of communication to lower the frequency offset between the wireless stations 201 and 220 when communicating over the higher band of communication. For example, equation 2 below may be used to adjust the frequency synthesizer for the higher band of communication to a new carrier frequency:

$$f_{C_{H_{new}}} = f_{C_H} * \frac{f_{off_L}}{f_{C_L}}, \quad (2)$$

where $fc_{H_{new}}$ is the new carrier frequency used in the higher band of communication, $f_{C_H}$ is the old carrier frequency in the higher band of communication, $f_{off_L}$ is the frequency offset in the lower band of communication, and $f_{C_L}$ is the carrier frequency in the lower band of communication. Similarly, adjusting the frequency synthesizer may also enable the use of longer beamforming training sequences used for the higher band of communication and better reception of higher band control PHY frames or packets may be realized.

FIG. 2B illustrates an example embodiment of a computing system 250 having stations 251 and 270. In embodiments, computing system 250 and stations 251 and 270 may operate in accordance of one or more standards, such as the WiGig/802.11ad Standards, the Wi-Fi Standards, and NG60 as similarly discussed above in FIGS. 1 and 2A. Further, wireless station 251 may be similar to or the same as wireless station 201 and wireless station 270 may be similar to or the same as wireless station 220 in FIG. 2A. Thus, like named components in FIG. 2B may operate similarly or the same as liked name components in FIG. 2A. However, wireless stations 251 and 270 may each have two clocks or crystal oscillators. More specifically, wireless station 251 may have a first clock 253-1 coupled with the first transceiver 205-1 and a second clock 253-2 coupled with the second transceiver 205-2. Similarly, wireless station 270 may have a first clock 273-1 coupled with the first transceiver 225-1 and a second clock 273-2 coupled with the second transceiver 225-2. Each of the clocks may provide a separate reference signal to the respectively coupled transceiver. Thus, in this example, the first and second transceivers of each wireless station are not frequency locked.

In embodiments where transceivers of the same wireless station are not frequency locked, frequency offsets may be calculated in a different manner than previously described above. In some embodiments a frequency offset between each of a wireless station's transceivers may be determined and shared with the other wireless station. More specifically, a frequency offset between the first transceiver 205-1 and the second transceiver 205-2 may be calculated or determined by communicating a continuous wave (CW), a squared wave signal, or packets by a transceiver on a one (lower) frequency band and receiving the harmonics of the signal or packets by other transceiver on another (higher) frequency band. For example, the first transceiver 205-1 may send a CW or squared wave signal on a lower band frequency and the second transceiver 205-2 may receive the harmonics of the CW or squared wave signal on the lower band frequency. Circuitry, such as processor 202, may determine the frequency offset between the first transceiver 205-1 (and first clock 253-1) and the second transceiver 205-2 (and second clock 253-2). Further, wireless station 270 may perform similar operations to determine the frequency offset between its first and second transceivers 225-1 and 225-2.

Moreover, each wireless station 251 and 270 can determine the frequency offsets between their respective transceivers and then communicate them to the other wireless station. For example, the wireless station 251 may determine the frequency offset between transceivers 205-1 and 205-2 and communicate the frequency offset to wireless station 270 on a lower band of communication. Similarly and in another example, wireless station 251 may determine the frequency offset between transceivers 205-1 and 205-2 and communicate the frequency offset to wireless 270 on a lower band of communication. Generally, the frequency offset between a station's transceivers is communicated on the lower band of communication because the higher band of communication has yet to be established. In some embodiments, the frequency offset may be communicated in a beacon message, a probe request, or response message communicated on a lower band of communication. However, various embodiments are not limited in this manner.

Each of the stations 251 and 270 may use the received frequency offset, between the other stations transceivers, the frequency offset between its own transceivers, and the frequency offset it measures in the lower frequency band between its own transceivers and the other station transceivers to determine the frequency offset in the lower band of communication. Further, the frequency offset in the lower band of communication may be used to determine the frequency offset in the higher band of communication and a frequency adjustment sequence. More specifically, equation 3 may be used to determine the frequency offset in the higher band of communication when transceivers in the same wireless station are not frequency locked:

$$f_{off_H} = \frac{f_{off_L} * f_{C_H}}{f_{C_L}} * \frac{\Delta f_{STA\_2}}{\Delta f_{STA\_1}}, \qquad (3)$$

where
$f_{off_H}$ is the frequency offset in the higher band of communication,
$f_{off_L}$ is the frequency offset in the lower band of communication,
$f_{C_H}$ is the carrier frequency in the higher band of communication,
$f_{C_L}$ is the carrier frequency in the lower band of communication,
$\Delta f_{STA\_2}$ is the frequency offset between transceivers of another station expressed in ppm, and
$\Delta f_{STA\_1}$ is the frequency offset between transceivers of the local station expressed in ppm.

Circuitry, such processors 202 and 222, on either or both of the wireless stations 251 and 270 may use the frequency offset for the higher band of communication to communicate packets on the higher band of communication. For example, circuitry may process information or data in packets by multiplying a signal by an offset adjustment sequence $$e^{-j2\pi \frac{f_{off_H}}{f_{samp_H}} n},$$

where $f_{off_H}$ is the frequency offset for the higher band of communication and $L_{off_H}$ is the sampling frequency for the higher band of communication, j is the square root of −1, and n is a time sample in discrete time. As previously mentioned, the frequency offset in the higher band of communication may be determined from and based on the frequency offset in the lower band of communication as illustrated in equation 3. The offset adjustment sequence may then be applied or multiplied to signals to process information and data in packets. By using the frequency offset in the lower band of communication to determine the offset frequency in the higher band of communication, longer beamforming training sequences can be used for the higher band of communication which typically uses directional communication. Further, better reception of higher band control PHY frames or packets may be realized.

In some embodiments, the frequency offset in the higher band of communication may be determined using equation 3 when only a single clock is present in a wireless station as long as the transceivers in the wireless station are not frequency locked. For example, a wireless station may have single clock, as illustrated in FIG. 2A, which may provide more than one reference clock signal. Thus, each transceiver may receive a different reference clock signal. In this example, equation 3 may be used to determine the frequency offset in the higher band of communication. Moreover, various embodiments are not limited to any number of clocks and a wireless station may have one, two, or more than two clocks to provide reference signals.

Figure 3A:
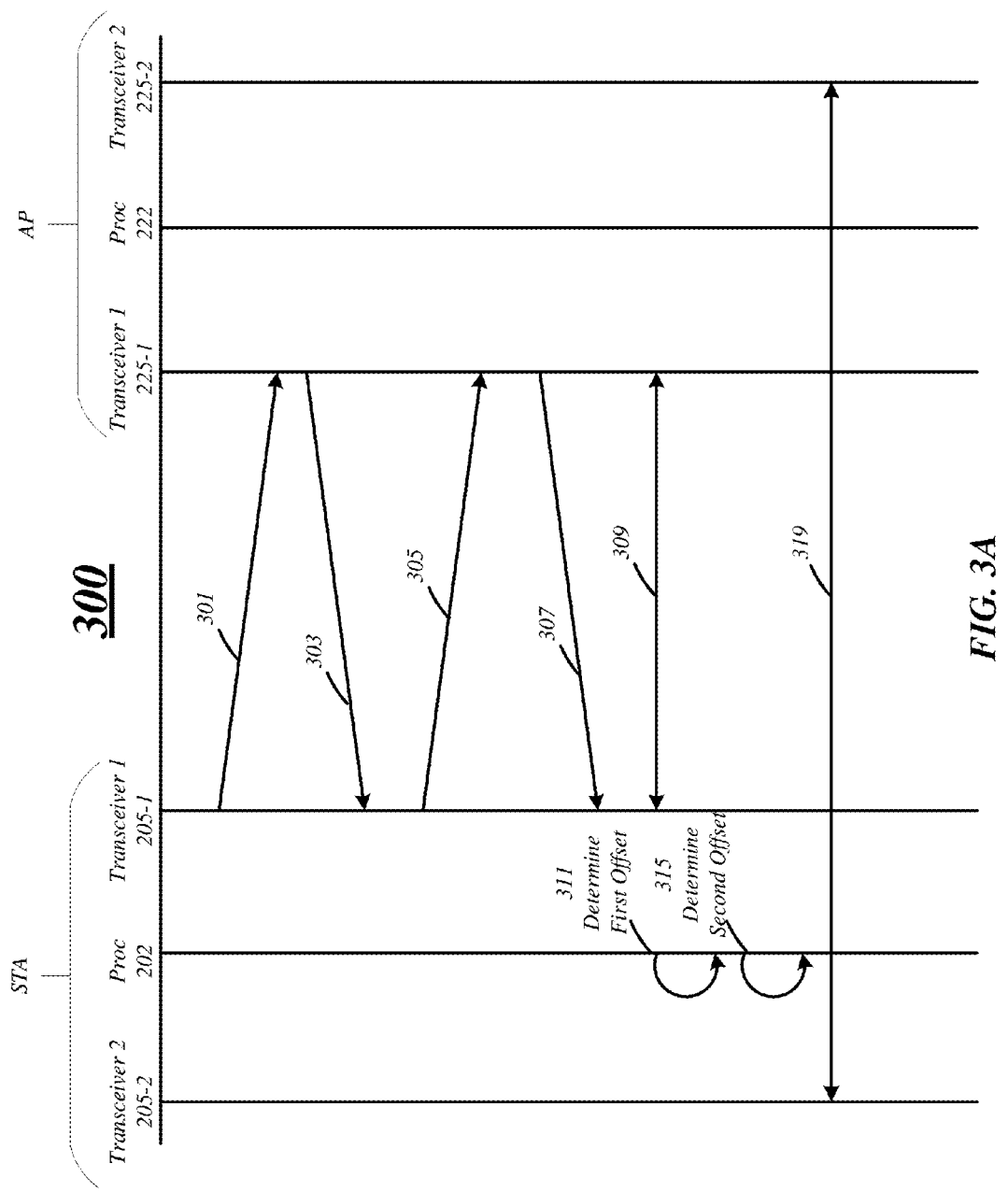
FIG. 3A illustrates an example embodiment of a first communication processing diagram.

FIG. 3A illustrates an example embodiment of a first communication and processing diagram 300 for wireless stations, such as a computing device or wireless station (STA) and an access point (AP). In this example embodiment, FIG. 3A illustrates communication and processes occurring on a STA and an AP when each have transceivers that are frequency locked. In addition, the STA and AP may be similar to or the same as one of the wireless stations previously discussed above with respect to FIGS. 1, and 2A. Various embodiments are not limited in this manner.

At line 301, the STA may communicate, via a first transceiver 205-1, a probe request or beacon message to determine and locate one or more access points that may be available or within range. In one example, the STA may communicate the beacon or probe request message on a lower band of communication, such as a 2.4 GHz and/or 5 GHz frequency band, in an omnidirectional pattern. The lower band may be used due to the longer range characteristics when using lower frequency communication. The probe request or beacon message may be received by any number of wireless stations and/or devices, including the AP. At line 303, the AP may communicate, via a first transceiver 225-1, a probe response or beacon response message on a lower band of communication in an omnidirectional pattern to indicate the presence of the AP to the STA. At lines 305 and 307, the STA and AP may communicate association information between each other to establish a connection or a link. The association communications may include one or more packets having user credentials and so forth to establish the connection, for example. Once a connection is establish, the STA and AP may communicate information and data between each other on the lower band of frequency at line 309. Any amount of information and data may be communicated in one or more packets.

Further, the AP and STA may communicate capabilities information indicating that they are capable of communicating on a higher band of communication, such as 60 GHz. The capabilities information may be communicated in one or more bits of one or more packets between the STA and the AP on the lower band of communication, for example. In some embodiments, the capabilities information may be communicated between the STA and AP in packet request/response messages or beacon messages. Once the STA and/or AP determines that the other device is capable of communicating on the higher band of communication, the STA and/or AP may enable a second transceiver, such as transceivers 205-2 and 225-2. In some embodiments, the second transceivers 205-2 and 225-2 used for communicating on a higher band of communication may be disabled, in a low power state, and/or powered off to save power and may be powered on once a device determines that it may communicate on a higher band of communication. However, various embodiments are not limited in this manner and the second transceivers 205-2 and 225-2 may always receive power, for example.

At lines 311 and 313, the STA a first frequency offset for the lower band of communication. The first frequency offset may be the offset between the STA and the AP, and in particular, clocks on the STA and AP. The STA may determine or calculate the first frequency offset based on measurements using the received packets, such as the one or more packets communicated at line 309 on the lower band of communication. Further and at line 315, the STA may determine a second frequency offset for communicating on a higher band of communication. In embodiments, when the both the STA and the AP include a first and second transceiver 205-1 and 205-2 (225-1 and 225-2 at the AP) that are frequency locked, equation 1 may be used to determine the second frequency offset for the higher band of communication.

At line 319, the STA and AP may communicate one or more packets via the higher band of communication. In some embodiments, the STA and/or AP may communicate the packets directional to extend the range of communication. Further and as previously discussed, the STA and AP may also process communicated signals with an offset adjustment sequence. In some embodiments, the STA and/or AP may cease communicating on the lower band of communication once they are communicating on the higher band of communication. Further, the STA and/or AP may also power down, turn off, or adjust the power to the transceivers communicating on the lower band of communication to conserve power. Various embodiments are not limited in this manner.

Figure 3B:
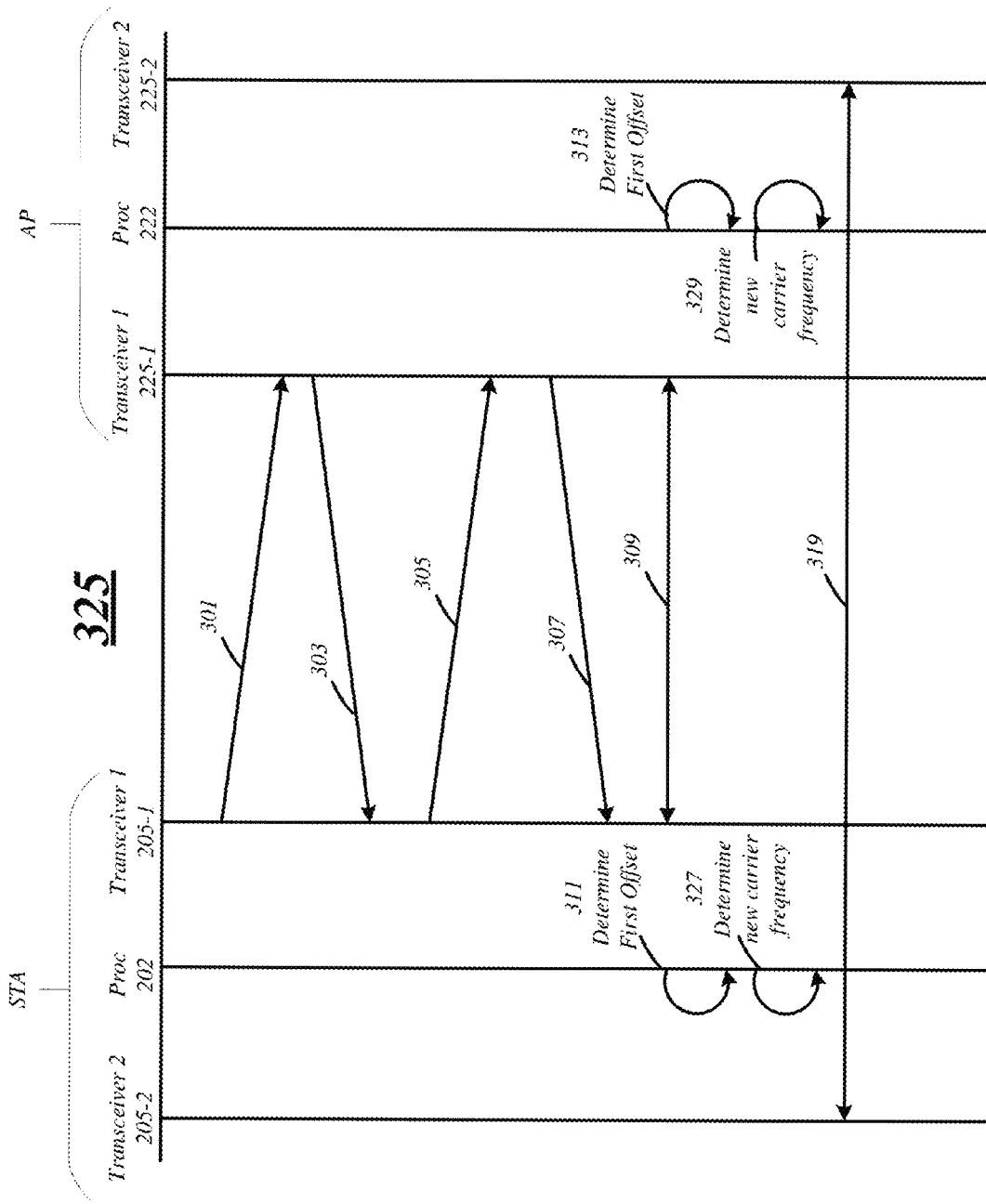
FIG. 3B illustrates an example embodiment of a second communication processing diagram.

FIG. 3B illustrates an example embodiment of a second communication and processing diagram 325 for wireless stations, such as a computing device or wireless station (STA) and an access point (AP). In this example embodiment, FIG. 3B illustrates communication and processes occurring on a STA and an AP when each have transceivers that are frequency locked. Further, FIG. 3B may include the same communication and processing as discussed above with respect to FIG. 3A except a new carrier frequency is determined at the STA and/or AP instead of or in addition to the second frequency offset in FIG. 3A.

More specifically and in some embodiments, the STA may determine a new carrier frequency for use by the second transceiver 205-2 when communicating on the higher band of communication at line 327. The new carrier frequency may be determined based on the first frequency offset determined at line 311. More specifically, the first frequency offset, the carrier frequency for the lower band of communication, and the current carrier frequency for the higher band of communication may be used to determine the new carrier frequency as illustrated in equation 2. Similarly and at line 329, a new carrier frequency may be determined for the higher band of communication at the AP using equation 2.

Although FIG. 3B illustrates the new carrier frequency determination occurring instead of determine a second frequency offset for a higher band of communication, various embodiments are not limited in this manner. The new carrier frequency determination may occur in addition to determining the second frequency offset, for example.

At lines 365 and 369, the AP and STA may determine a first frequency offset for the lower band of communication. The first frequency offset may be the offset between the STA and the AP, and in particular, clocks on the STA and AP. The STA and AP may determine or calculate the first frequency offset based on measurements using the received packets, such the one or more packets communicated at line 351 on the lower band of communication.

Figure 3C:
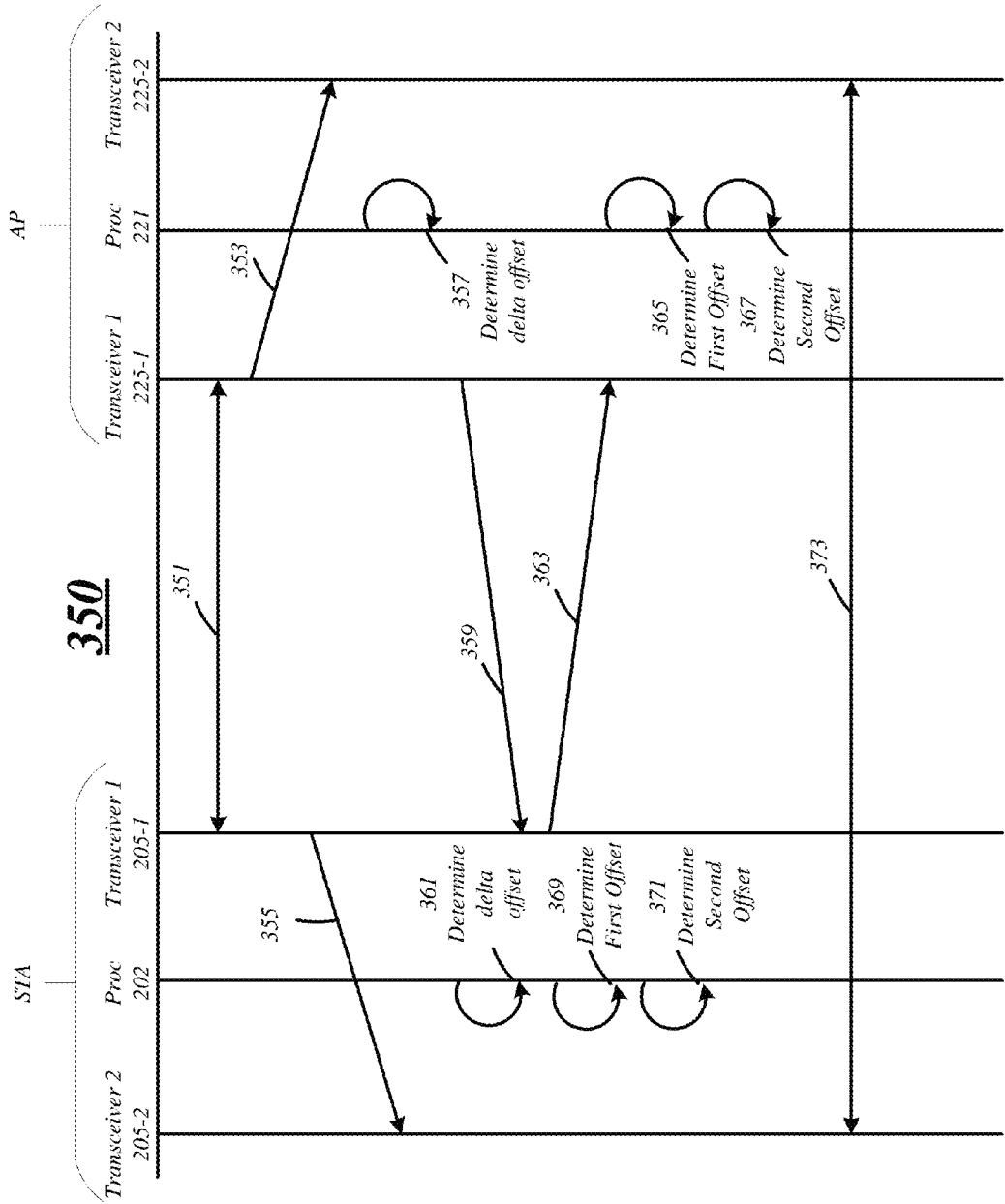
FIG. 3C illustrates an example embodiment of a third communication processing diagram.

FIG. 3C illustrates an example embodiment of a third communication and processing diagram 350 for wireless stations, such as a computing device or wireless station (STA) and an access point (AP). In this example embodiment, FIG. 3C illustrates communication and processes occurring on a STA and an AP when each have transceivers that are not frequency locked.

At line 351, the STA and AP may be communicating on a lower band of communication. A communication link may have already been established between the STA and the AP, as previously discussed above with respect to FIGS. 3A/3B lines 301 through 307. For example, one or more of probe messages, beacon messages, and association messages may have been communicated to establish a communication link. The STA and AP may communicate any type of information and data between each other using one or more packets communicated on the lower band of communication. In addition, the STA, the AP, or both may communicate capabilities information to indicate that it is higher band communication capable. The STA and AP may also enable a transceiver to communicate on the higher band of communication.

At line 353, the AP may communicate one or more packets or a CW signal via a first transceiver 225-1 which may be received by a second transceiver 225-2 of the AP. The second transceiver 225-2 may generally communicate on the higher band of communication, but may be adjusted to receive the higher harmonics of the packet or CW signal on the lower band of communication. Similarly and at line 355, the STA may communicate one or more packets or a CW signal via a first transceiver 205-1 on a lower band of communication which may be received by a second transceiver 205-2 of the STA. At lines 357 the AP may determine a difference or delta frequency offset between its transceivers 225-1 and 225-2 and at line 361 the STA may determine a difference or delta frequency offset between its transceivers 205-1 and 205-2. Further and at line 359, the AP may communicate its difference or delta frequency offset with the STA and at line 363 the STA may communicate its difference or delta frequency offset with the AP. The delta frequency offsets may be communicated between the STA and the AP via a beacon message, a probe message, a probe request, a probe response, and so forth.

In some embodiments, the AP may determine a first frequency offset between itself and the STA at line 365 and the STA may determine a first frequency offset between itself and the AP at line 369. The first frequency offset at each of the AP and STA may be the frequency offset between their respective clocks based on communicating on a lower band of communication. Further and at line 367, the AP may determine a second frequency offset for communicating on a higher band of communication. In embodiments, when the AP includes a first and second transceiver 225-1 and 225-2 that are not frequency locked, equation 3 may be used to determine the second frequency offset for the higher band of communication. Similarly and at line 371, the STA may determine a second frequency for communicating on a higher band of communication using equation 3. At line 373, the STA and AP may communicate information and data via one or more packets.

Figure 4:
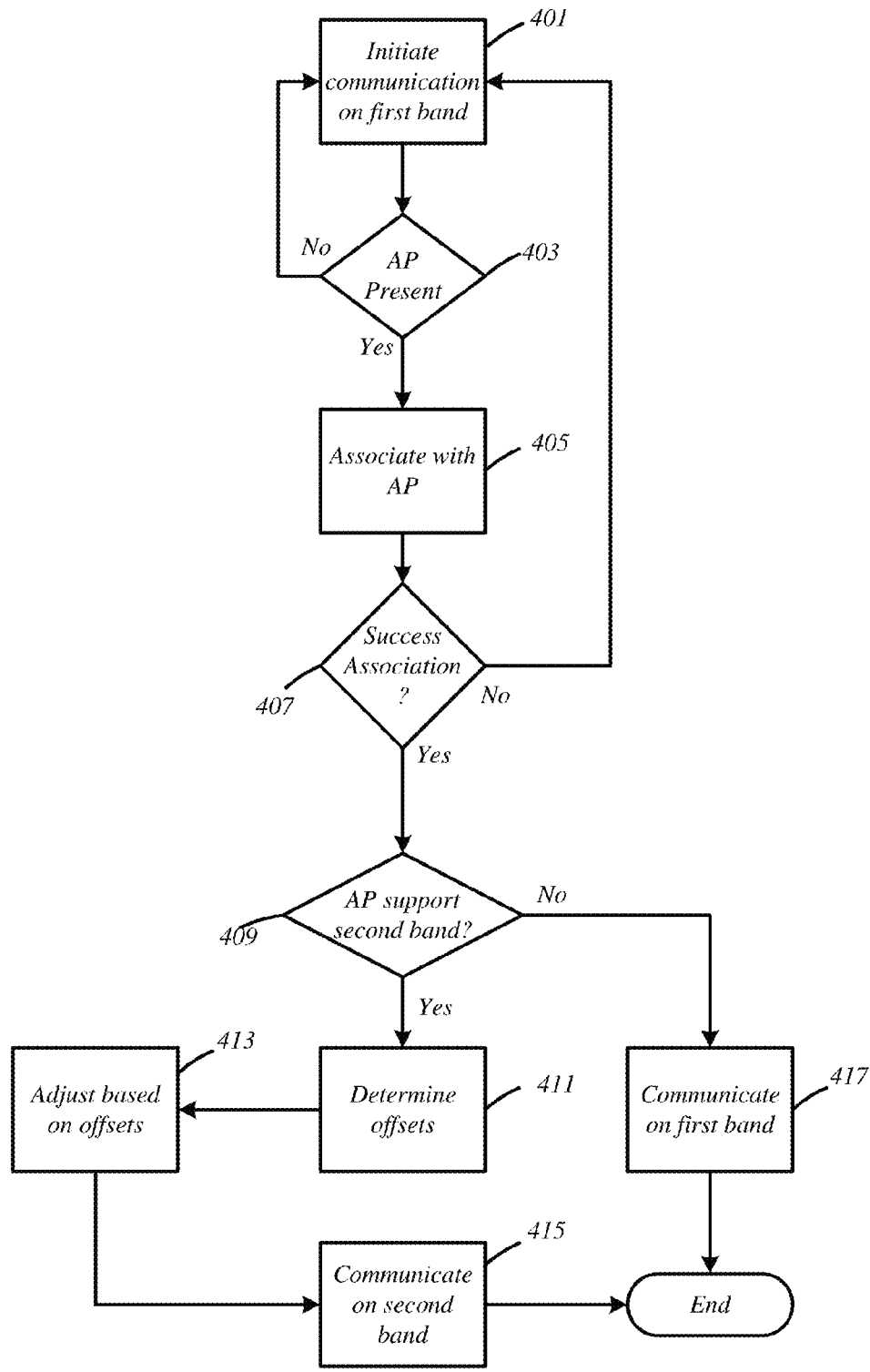
FIG. 4 illustrates an example embodiment of a first logic flow diagram.

FIG. 4 illustrates an embodiment of a first logic flow diagram 400. The logic flow 400 may be representative of some or all of the operations executed by one or more embodiments described herein. For example, the logic flow 400 may illustrate operations performed by one or more systems, devices, stations, etc. in FIGS. 1-3B, and 5-7. Various embodiments are not limited in this manner.

At block 401, a wireless station may initiate communication on a first band of communication. In embodiments, the first band of communication may be a lower band of communication, such as on frequencies in around 2.4 GHz and/or 5 GHz. Moreover, the wireless station may initiate communication by communicate one or more of a probe request and beacon messages to determine and locate other wireless stations or APs in range. If at decision block 403, an AP is not located or determined to be within range, the wireless station may continue to communicate probe request and/or beacon messages until an AP is in range.

However, if an AP is in range the wireless station may associate with the AP at block 405. More specifically, the wireless station and/or the AP may communicate information and credentials between each to establish an association and a communication link. At decision block 407 a determination may be made as to whether the association is successful or not. If the association attempt is not successful, the wireless station may continue to look for other APs.

If the association attempt is successful, the wireless station and the AP may communicate information and data between each other on the first band of communication. Further and at block 409, the wireless station may determine the AP supports communication on other or different frequency bands. For example, the wireless station and AP may share capabilities information and data indicating that they can communicate on a higher band of communication. If the AP cannot communicate on a second band of communication, the wireless station may continue to communicate with the AP on the lower band of communication at block 417.

If the AP can communicate on a second band of communication, such as a higher band of communication in the 60 GHz range, the wireless station (and AP) may determine frequency offsets at block 411. More specifically, in the case when the transceivers on the wireless station are frequency locked, the wireless station may determine the frequency offset between the wireless station and the AP for the lower band of communication. Similarly, the AP may also determine the frequency offset between the wireless station and the AP at block 411. Further and at block 413, the wireless station may make adjustments for a second transceiver to communicate on the second band of communication. For example, the wireless station may determine a frequency offset for the second band of communication and a frequency adjustment sequence based on the frequency offset determined at block 411. In some embodiments, the wireless station may adjust a frequency synthesizer to use a new carrier frequency for the second band of frequency based on the frequency offset determined at block 411. The AP may also make adjusts including determining a frequency offset for a higher band of communication and a frequency adjustment sequence based on its frequency offset determined at block 411. The AP may also make an adjustment to a frequency synthesizer to use a new carrier frequency.

In some embodiments, in the case when the transceivers on the wireless station are not frequency locked, the wireless station may determine the frequency offset between the transceivers on the wireless station by communicating packets or a CW signal on the first band communication. Further, the wireless station may receive a frequency offset between transceivers on the AP if the transceivers on the AP are not frequency locked. The wireless station may determine the frequency offset between the wireless station and the AP for the lower band of communication. Further, and at block 413, the wireless station may make adjustments for a second transceiver to communicate on the second band of communication. For example, the wireless station may determine a frequency offset for the second band of communication and a frequency adjustment sequence based on the frequency offset determined at block 411. In some embodiments, the wireless station may adjust a frequency synthesizer to use a new carrier frequency for the second band of frequency based on the frequency offset determined at block 411. At block 415, the wireless station and AP may communicate on the second band of communication. The AP may make similarly adjustments to communicate on the higher band of communication. However, embodiments are not limited in this manner.

FIG. 5 illustrates an embodiment of a second logic flow diagram 500. The logic flow 500 may be representative of some or all of the operations executed by one or more embodiments described herein. For example, the logic flow 500 may illustrate operations performed by one or more systems or devices in FIGS. 1-4, 6 and 7. Various embodiments are not limited in this manner.

The logic flow 500 may include determining a first frequency offset for a first band of communication based on one or more packets communicated by a first transceiver, at block 505. For example, the first transceiver may receive any number of packets from a transceiver of another device on a first frequency, such as a lower frequency band. A frequency offset may be determined between the receiving transceiver and the sending transceiver based on measurements made at the receiving transceiver's wireless station.

At block 510, the logic flow 500 may include determining a second frequency offset for a second band of communication based on the first frequency offset. As previously discussed, the first frequency offset or frequency offset for the lower band of communication may be used to determine a second frequency using equation 1 when transceivers are frequency locked and using equation 3 when transceivers are not frequency locked.

The logic flow 500 may include processing one or more packets of information communicated on the second band of communication via a second transceiver based on the second frequency offset. In some embodiments, the second band of communication may be a higher band of communication. Further and in some embodiments, the packets may be processed by the application of an offset adjustment sequence as previously discussed above. In addition, a new carrier frequency may be determined and used for the second frequency band.

Figure 6:
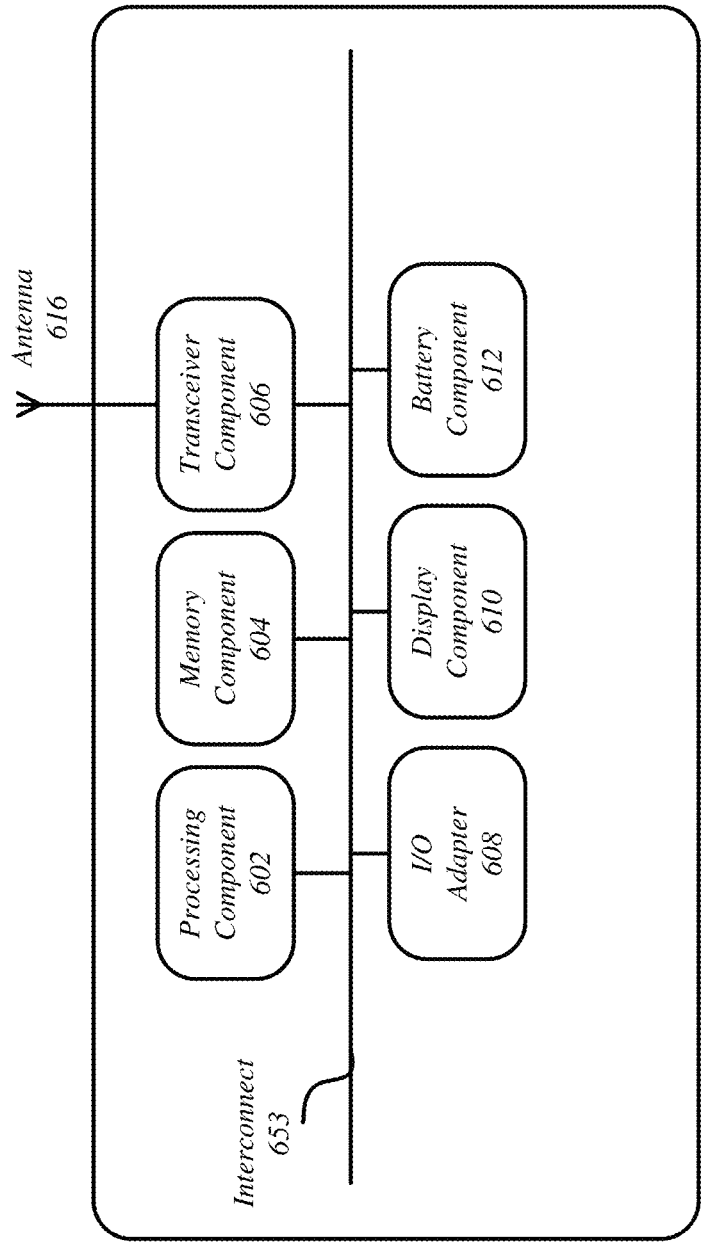
FIG. 6 illustrates an example embodiment of a computing device.

FIG. 6 illustrates an embodiment of a computing device 605. In various embodiments, computing device 605 may be representative of a computing device or system for use with one or more embodiments described herein, such as those discussed in FIGS. 1-5.

In various embodiments, computing device 605 may be any type of computing device including a computing device including a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a computing device 605 also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a computing device 605 may be implemented as a smart phone capable of executing computer applications, as well as voice communications and/or data communications. Although some embodiments may be described with a computing device 605 implemented as a smart phone by way of example, it may be appreciated that other embodiments may be implemented using other wireless mobile computing devices as well. The embodiments are not limited in this context. In some embodiments, computing device 605 may also be a navigation system, infotainment system, embedded in home appliances, etc.

As shown in FIG. 6, computing device 605 may include multiple elements. One or more elements may be implemented using one or more circuits, components, registers, processors, software subroutine modules, or any combination thereof, as desired for a given set of design or performance constraints. Although FIG. 6 shows a limited number of elements in a certain topology by way of example, it can be appreciated that more or less elements in any suitable topology may be used in computing device 605 as desired for a given implementation. The embodiments are not limited in this context.

In various embodiments, computing device 605 may include one or more processing unit(s) 602. Processing unit(s) 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit or processing circuitry. The processing unit(s) 602 may be connected to and communicate with the other elements and components of the computing system via an interconnect 543, such as one or more buses, control lines, and data lines.

In one embodiment, computing device 605 may include memory 604 to couple to processing unit(s) 602. In various embodiments, the memory 604 may store data and information for use by the computing device 605.

Memory 604 may be coupled to processing unit(s) 602 via interconnect 653, or by a dedicated communications bus between processing unit(s) 602 and memory 604, as desired for a given implementation. Memory 604 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory 604 can store instructions and data momentarily, temporarily, or permanently. The memory 604 may also store temporary variables or other intermediate information while the processing unit(s) 602 is executing instructions. The memory 604 is not limited to storing the above discussed data and may store any type of data.

The computing device 605 may include a transceiver 606 which includes one or more components and circuitry to transmit and receive information using radio-frequency signals. More specifically, the transceiver 606 may include circuitry to produce radio-frequency mobile radio signals which are to be sent and for processing radio-frequency mobile radio signals which have been received. To this end, the transceiver 606 may be coupled to one or more antenna 616. The transmitted or received mobile radio signals are in one or more particular frequency ranges, which are typically prescribed by the mobile radio standard(s) supported by the radio-frequency assemblies. For example, transceiver 606 may include circuitry to process information according to one or more IEEE standards, one or more peer-to-peer protocols, and so forth. Various embodiments are not limited in this manner and transceiver 606 may transmit or receive information via any standard in any frequency range with one more devices, as previously mentioned.

In various embodiments, the transceiver 606 may be used to communicate with one or more other devices or stations via one or more antennas 616. The transceiver 606 may send and receive information from the stations as one or more pockets, frames, and any other transmission structure in accordance with one or more protocols.

The computing device 605 may include input/output adapter 608. Examples of I/O adapter 608 may include Universal Serial Bus (USB) ports/adapters, IEEE 1394 Firewire ports/adapters, and so forth. The embodiments are not limited in this context.

For example, an I/O adapter 608 may also include an input device or sensor, such as one or more buttons, a keyboard, a keypad, a touchscreen display, a touch sensitive device, a microphone, a biometric finger printer reader, biometric eye scanner or any other device used for inputting information into computing device 605. Moreover, the I/O adapter 608 may be a sensor including any hardware or logic to detect one or more touches or inputs on or near a housing of the apparatus, a display of the apparatus including a touchscreen or touch sensitive display.

In various embodiments, the I/O adapter 608 may include one or more components to output information to a user. For example, the I/O adapter 608 may include a speaker to output an audible noise or a haptic feedback device to output a vibration. The I/O adapter 608 may be located any within or on computing device 605, or may be separate and connected to the computing device 605 via a wired or wireless connection.

The computing device 605 may also include a display 610. Display 610 may constitute any display device capable of displaying information received from processor units 602, such as liquid crystal display (LCD), cathode ray tube (CRT) display, a projector, and so forth. Various embodiments are not limited in this manner.

The computing device 605 may also include storage 612. Storage 612 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 612 may include technology to increase the storage performance enhanced protection for valuable digital media when multiple hard drives are included, for example. Further examples of storage 612 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Figure 7:
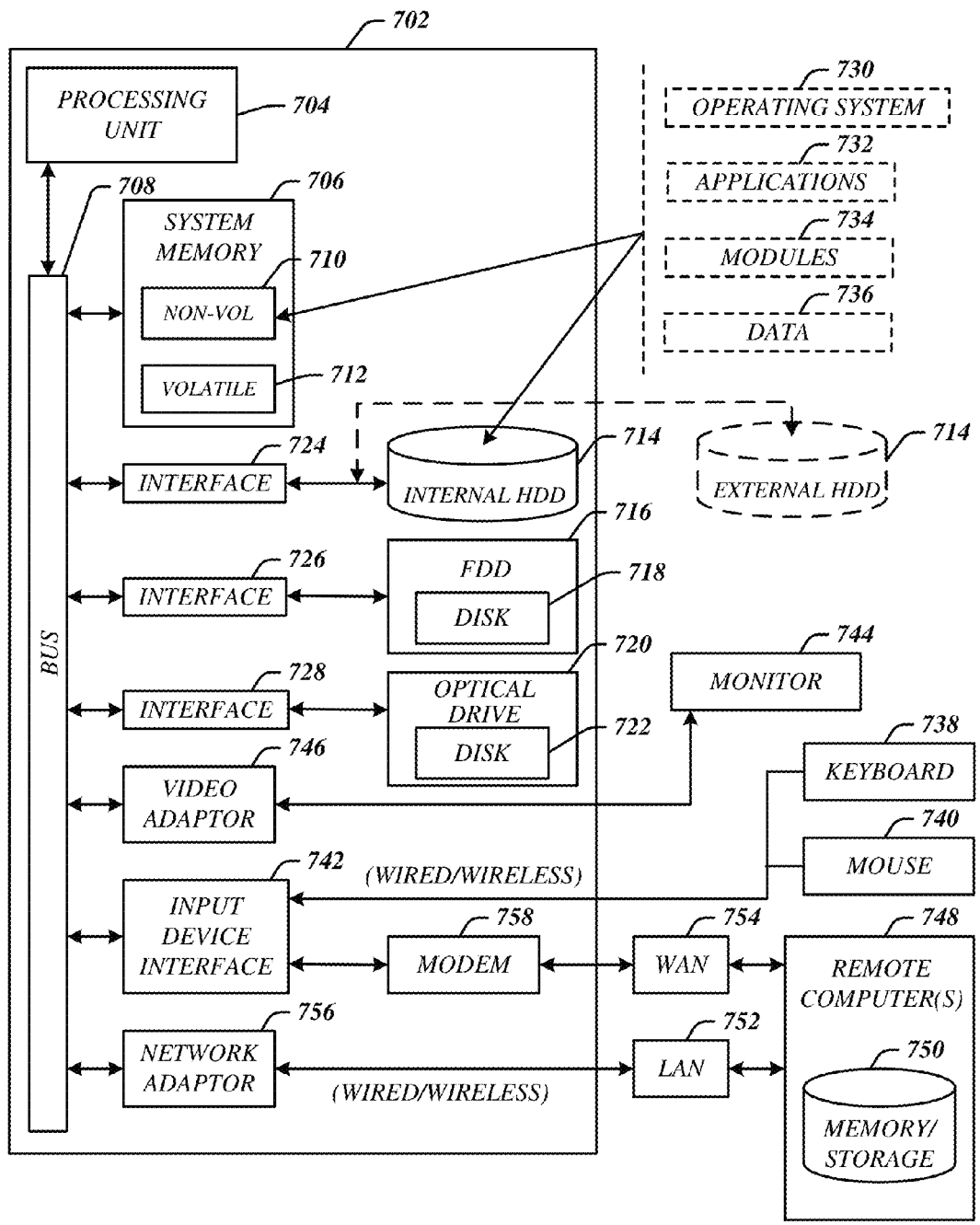
FIG. 7 illustrates an example embodiment of a computing architecture.

FIG. 7 illustrates an embodiment of an exemplary computing architecture 700 suitable for implementing various embodiments as previously described. In one embodiment, the computing architecture 700 may include or be implemented as part of system 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the devices in FIGS. 1-6.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the system and devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
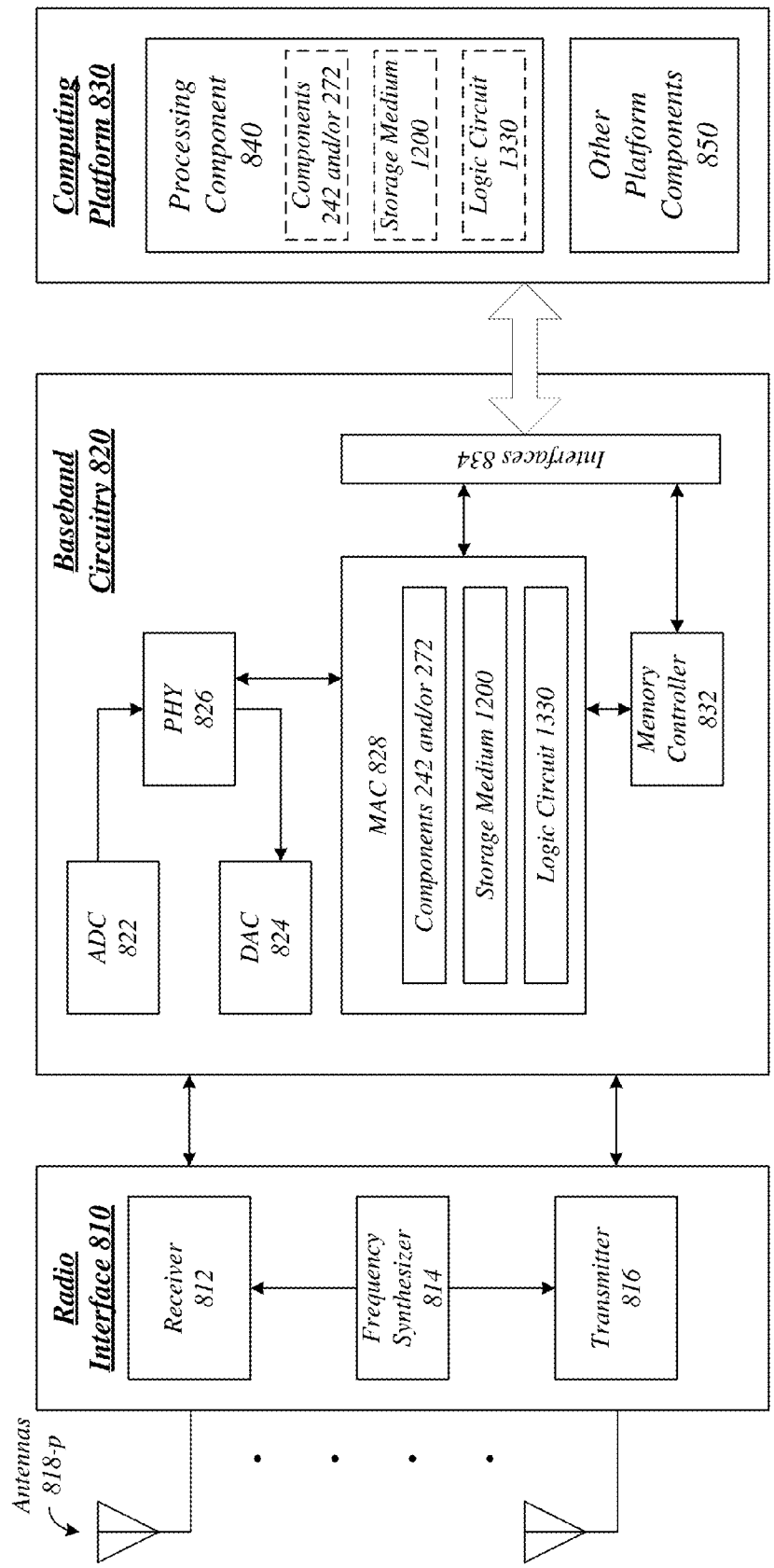
FIG. 8 illustrates an example embodiment of a second computing architecture.

FIG. 8 illustrates an embodiment of a device 800 for use in a WLAN system, such as the wireless networks illustrated in FIGS. 1, 2A and 2B. Device 800 may implement, for example, the wireless stations, access points, storage medium 1200 and/or a logic circuit 1330 discussed herein. The logic circuit 830 may include physical circuits to perform operations described for the wireless stations 104 or the access points. As shown in FIG. 8, device 800 may include a radio interface 810, baseband circuitry 820, and computing platform 830, although embodiments are not limited to this configuration.

The device 800 may implement some or all of the structure and/or operations for the wireless stations 104, access points, storage medium 1200 and/or a logic circuit 1330 in a single computing entity, such as entirely within a single device. Alternatively, the device 800 may distribute portions of the structure and/or operations for the wireless stations 104, access points, storage medium 1200 and/or a logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-$p$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 856 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames, such as radio frames. Alternatively or in addition, MAC processing circuit 828 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for the wireless station 104, base station 800, storage medium 1000, and logic circuit 1330 using the processing component 830. The processing component 830 (and/or PHY 826 and/or MAC 828) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired. In some embodiments, device 800 may be configured to be compatible with protocols and frequencies associated one or more of the standards discussed herein.

Embodiments of device 800 may be implemented using single input single output (SISO) architectures. However, certain implementations may include multiple antennas (e.g., antennas 818-$p$) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The detailed disclosure now turns to providing examples that pertain to further embodiments. Examples one through twenty-six (1-26) provided below are intended to be exemplary and non-limiting.

In a first example, a system, device, controller, or an apparatus may include circuitry, a first transceiver coupled with the circuitry, the first transceiver operative to communicate one or more packets in a first band of communication. Embodiments may include a second transceiver coupled with the circuitry, the second transceiver operative to communicate one or more packets in a second band of communication different than the first band. Further, the circuitry may determine a first frequency offset for the first band of communication based on one or more packets communicated by the first transceiver, determine a second frequency offset for the second band of communication based on the first frequency offset, and process one or more packets of information communicated on the second band of communication via the second transceiver based on the second frequency offset.

In a second example and in furtherance of the first example, a system, device, controller, or an apparatus may include the first band of communication comprising a lower band of communication in at least one of a 2.4 gigahertz (GHz) band and a 5 GHz band, and the second band of communication comprising a higher band of communication in a 60 GHz band.

In a third example and in furtherance of any of the previous examples, a system, device, controller, or an apparatus may include the circuitry to determine another device is capable of communicating via the second band of communication based on one or more bits in the one or more packets of information received on the first band of communication, and to enable the second transceiver to communicate if the other device is capable of communicating via the second band of communication.

In a fourth example and in furtherance of any of the previous examples, a system, device, controller, or an apparatus may include the one or more bits to indicate a first transceiver and a second transceiver of the other device are frequency locked.

In a fifth example and in furtherance of any of the previous examples, a system, device, controller, or an apparatus may include the circuitry to determine the second frequency offset using the first frequency offset, a carrier frequency for the first band of communication, and a carrier frequency for the second band of communication.

In a sixth example and in furtherance of any of the previous examples, a system, device, controller, or an apparatus may include the circuitry to determine an offset adjustment sequence using the second frequency offset and a sampling frequency offset of the second band of communication, and process the one or more packets received on the second band of communication by multiplying a signal on the second band by the offset adjustment sequence.

In a seventh example and in furtherance of any of the previous examples, a system, device, controller, or an apparatus may include the circuitry to process the one or more packets communicated on the second band of communication by adjusting a frequency synthesizer coupled with the second transceiver to a new carrier frequency for the second band of communication using the first frequency offset, a carrier frequency for the first band of communication, and a current carrier frequency for the second band of communication.

In an eighth example and in furtherance of any of the previous examples, a system, device, controller, or an apparatus may include the circuitry to receive a third frequency offset between a first clock and a second clock of another device, determine a fourth frequency offset between a third clock and a fourth clock of the apparatus, and determine the second frequency offset for the second band of communication using the third and fourth frequency offsets.

In a ninth example and in furtherance of any of the previous examples, a system, device, controller, or an apparatus may include the circuitry to send a continuous wave (CW), a squared wave signal on the first band of communication by the first transceiver and receive the harmonics of the CW or a squared wave signal by the second transceiver to determine fourth frequency offset between the third clock and the fourth clock.

In a tenth example and in furtherance of any of the previous examples, a system, device, controller, or an apparatus may include memory coupled with a memory controller, a first antenna coupled with the first transceiver, and a second antenna coupled with the second transceiver.

In an eleventh example and in furtherance of any of the previous examples, at least one non-transitory computer-readable storage medium may include instructions that when executed cause processing circuitry to determine a first frequency offset for a first band of communication based on one or more packets communicated by a first transceiver, determine a second frequency offset for a second band of communication based on the first frequency offset, and process one or more packets of information communicated on the second band of communication via a second transceiver based on the second frequency offset.

In a twelfth example and in furtherance of any of the previous examples, at least one non-transitory computer-readable storage medium may include the first band of communication comprising a lower band of communication in at least one of a 2.4 gigahertz (GHz) band and a 5 GHz band, and the second band of communication comprising a higher band of communication in a 60 GHz band.

In a thirteenth example and in furtherance of any of the previous examples, at least one non-transitory computer-readable storage medium may include instructions that when executed cause processing circuitry to determine another device is capable of communicating via the second band of communication based on one or more bits in the one or more packets of information received on the first band of communication, and to enable the second transceiver to communicate if the other device is capable of communicating via the second band of communication.

In a fourteenth example and in furtherance of any of the previous examples, at least one non-transitory computer-readable storage medium may include instructions that when executed cause processing circuitry to process the one or more bits to indicate a first transceiver and a second transceiver of the other device are frequency locked.

In a fifteenth example and in furtherance of any of the previous examples, at least one non-transitory computer-readable storage medium may include instructions that when executed cause processing circuitry to determine the second frequency offset using the first frequency offset, a carrier frequency for the first band of communication, and a carrier frequency for the second band of communication.

In a sixteenth example and in furtherance of any of the previous examples, at least one non-transitory computer-readable storage medium may include instructions that when executed cause processing circuitry to determine an offset adjustment sequence using the second frequency offset and a sampling frequency offset of the second band of communication, and process the one or more packets received on the second band of communication by multiplying a signal on the second band by the offset adjustment sequence.

In a seventeenth example and in furtherance of any of the previous examples, at least one non-transitory computer-readable storage medium may include instructions that when executed cause processing circuitry to process the one or more packets communicated on the second band of communication by adjusting a frequency synthesizer of the second transceiver to a new carrier frequency for the second band of communication using the first frequency offset, a carrier frequency for the first band of communication, and a current carrier frequency for the second band of communication.

In an eighteenth example and in furtherance of any of the previous examples, at least one non-transitory computer-readable storage medium may include instructions that when executed cause processing circuitry to receive a third frequency offset between a first clock and a second clock of another device, determine a fourth frequency offset between a third clock and a fourth clock, and determine the second frequency offset for the second band of communication using the third and fourth frequency offsets.

In a nineteenth example and in furtherance of any of the previous examples, at least one non-transitory computer-readable storage medium may include instructions that when executed cause processing circuitry to send a continuous wave (CW) or a squared wave signal on the first band of communication by the first transceiver and receive the harmonics of the CW or a squared wave signal by the second transceiver to determine the fourth frequency offset between the third clock and the fourth clock.

In a twentieth example and in furtherance of any of the previous examples, a system, device, controller, or an apparatus may include circuitry, a first transceiver coupled with the circuitry, and a second transceiver coupled with the first transceiver and the circuitry. The circuitry to send, via the first transceiver, one or more packets on a first frequency band, receive, via the second transceiver, the one or more packets, determine a delta frequency offset between the first transceiver and the second transceiver based on the one or more packets, and send, via the first transceiver, the delta frequency offset on the first frequency band to another device.

In a twenty-first example and in furtherance of any of the previous examples, a system, device, controller, or an apparatus may include receive a second delta frequency offset for the other device on the first frequency band, and determine a first frequency offset between the apparatus and the other device for the first frequency band.

In a twenty-second example and in furtherance of any of the previous examples, a system, device, controller, or an apparatus may include determine a second frequency offset between the apparatus and the other device for a second frequency band using the first frequency offset, the delta frequency offset, and the second delta frequency offset; and process one or more packets of information communicated on the second frequency band via the second transceiver based on the second frequency offset.

In a twenty-third example and in furtherance of any of the previous examples, at least one non-transitory computer-readable storage medium may include instructions that when executed cause processing circuitry to send, via a first transceiver, one or more packets on a first frequency band, receive, via a second transceiver, the one or more packets, determine a delta frequency offset between the first transceiver and the second transceiver based on the one or more packets, and send, via the first transceiver, the delta frequency offset on the first frequency band to another device.

In a twenty-fourth example and in furtherance of any of the previous examples, at least one non-transitory computer-readable storage medium may include instructions that when executed cause processing circuitry to receive a second delta frequency offset for the other device on the first frequency band, and determine a first frequency offset between the apparatus and the other device for the first frequency band.

In a twenty-fifth example and in furtherance of any of the previous examples, at least one non-transitory computer-readable storage medium may include instructions that when executed cause processing circuitry to determine a second frequency offset between the apparatus and the other device for a second frequency band using the first frequency offset, the delta frequency offset, and the second delta frequency offset, and process one or more packets of information communicated on the second band of communication via the second transceiver based on the second frequency offset.

In a twenty-sixth example and in furtherance of any of the previous examples, a computer-implemented method may include performing one or more of the processes or operations as previously described above with respect to examples described above.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
circuitry; a first transceiver coupled with the circuitry, the first transceiver operative to communicate one or more packets in a first band of communication; and a second transceiver coupled with the circuitry, the second transceiver operative to communicate one or more packets in a second band of communication different than the first band, and
the circuitry to:
determine a first frequency offset for the first band of communication based on one or more packets communicated by the first transceiver, determine a second frequency offset for the second band of communication based on the first frequency offset, a carrier frequency for the first band of communication, and a carrier frequency for the second band of communication, wherein the second frequency offset is a result of the first frequency offset multiplied by the carrier frequency for the second band of communication divided by the carrier frequency for the first band of communication, and
process one or more packets of information communicated on the second band of communication via the second transceiver based on the second frequency offset.

2. The apparatus of claim 1, the first band of communication comprising a lower band of communication in at least one of a 2.4 gigahertz (GHz) band and a 5 GHz band, and the second band of communication comprising a higher band of communication in a 60 GHz band.

3. The apparatus of claim 1, the circuitry to determine another device is capable of communicating via the second band of communication based on one or more bits in the one or more packets of information received on the first band of communication, and to enable the second transceiver to communicate if the other device is capable of communicating via the second band of communication.

4. The apparatus of claim 3, the one or more bits to indicate a first transceiver and a second transceiver of the other device are frequency locked.

5. The apparatus of claim 1, the circuitry to determine an offset adjustment sequence using the second frequency offset and a sampling frequency offset of the second band of communication, and process the one or more packets received on the second band of communication by multiplying a signal on the second band by the offset adjustment sequence.

6. The apparatus of claim 1, the circuitry to process the one or more packets communicated on the second band of communication by adjusting a frequency synthesizer coupled with the second transceiver to a new carrier frequency for the second band of communication using the first frequency offset, a carrier frequency for the first band of communication, and a current carrier frequency for the second band of communication.

7. The apparatus of claim 1, the circuitry to receive a third frequency offset between a first clock and a second clock of another device, determine a fourth frequency offset between a third clock and a fourth clock, and determine the second frequency offset for the second band of communication using the third and fourth frequency offsets.

8. The apparatus of claim 7, the circuitry to send a continuous wave (CW) or a squared wave signal on the first band of communication by the first transceiver and receive harmonics of the CW or a squared wave signal by the second transceiver to determine the fourth frequency offset between the third clock and the fourth clock.

9. The apparatus of claim 1, comprising: memory coupled with a memory controller; a first antenna coupled with the first transceiver; and a second antenna coupled with the second transceiver.

10. At least one non-transitory computer-readable storage medium comprising instructions that when executed cause processing circuitry to:
determine a first frequency offset for a first band of communication based on one or more packets communicated by a first transceiver;
determine a second frequency offset for a second band of communication based on the first frequency offset, a carrier frequency for the first band of communication, and a carrier frequency for the second band of communication, wherein the second frequency offset is a result of the first frequency offset multiplied by the carrier frequency for the second band of communication divided by the carrier frequency for the first band of communication; and
process one or more packets of information communicated on the second band of communication via a second transceiver based on the second frequency offset.

11. The at least one non-transitory computer-readable storage medium of claim 10, the first band of communication comprising a lower band of communication in at least one of a 2.4 gigahertz (GHz) band and a 5 GHz band, and the second band of communication comprising a higher band of communication in a 60 GHz band.

12. The at least one non-transitory computer-readable storage medium of claim 10, comprising instructions that when executed cause the processing circuitry to determine another device is capable of communicating via the second band of communication based on one or more bits in the one or more packets of information received on the first band of communication, and to enable the second transceiver to communicate if the other device is capable of communicating via the second band of communication.

13. The at least one non-transitory computer-readable storage medium of claim 12, the one or more bits to indicate a first transceiver and a second transceiver of the other device are frequency locked.

14. The at least one non-transitory computer-readable storage medium of claim 10, comprising instructions that when executed cause the processing circuitry to determine an offset adjustment sequence using the second frequency offset and a sampling frequency offset of the second band of communication, and process the one or more packets received on the second band of communication by multiplying a signal on the second band by the offset adjustment sequence.

15. The at least one non-transitory computer-readable storage medium of claim 10, comprising instructions that when executed cause the processing circuitry to process the one or more packets communicated on the second band of communication by adjusting a frequency synthesizer of the second transceiver to a new carrier frequency for the second band of communication using the first frequency offset, a carrier frequency for the first band of communication, and a current carrier frequency for the second band of communication.

16. The at least one non-transitory computer-readable storage medium of claim 10, comprising instructions that when executed cause the processing circuitry to receive a third frequency offset between a first clock and a second clock of another device, determine a fourth frequency offset between a third clock and a fourth clock, and determine the second frequency offset for the second band of communication using the third and fourth frequency offsets.

17. The at least one non-transitory computer-readable storage medium of claim 16, comprising instructions that when executed cause the processing circuitry to send a continuous wave (CW) or a squared wave signal on the first band of communication by the first transceiver and receive the harmonics of the CW or a squared wave signal by the second transceiver to determine the fourth frequency offset between the third clock and the fourth clock.

18. An apparatus, comprising: circuitry for a device; a first transceiver coupled with the circuitry; and a second transceiver coupled with the first transceiver and the circuitry, and the circuitry to:
send, via the first transceiver, one or more packets on a first frequency band, receive, via the second transceiver, the one or more packets, determine a delta frequency offset between the first transceiver and the second transceiver based on the one or more packets,
send, via the first transceiver, the delta frequency offset on the first frequency band to another device,
determine a second frequency offset between the device and the other device for a second frequency band using a first frequency offset, the delta frequency offset, and a second delta frequency offset, wherein the second frequency offset is a product of the first frequency offset and a carrier frequency for a second band of communication divided by a carrier frequency for a first band of communication multiplied by a result of the second delta frequency offset divided by the first delta frequency offset; and
process one or more packets of information communicated on the second frequency band via the second transceiver based on the second frequency offset.

19. The apparatus of claim 18, the circuitry to:
receive the second delta frequency offset for the other device on the first frequency band; and determine the first frequency offset between the device and the other device for the first frequency band.

20. At least one non-transitory computer-readable storage medium comprising instructions that when executed cause processing circuitry to:
send, via a first transceiver, one or more packets on a first frequency band, receive, via a second transceiver, the one or more packets,
determine a delta frequency offset between the first transceiver and the second transceiver based on the one or more packets,
send, via the first transceiver, the delta frequency offset on the first frequency band to another device,
determine a second frequency offset between the device and the other device for a second frequency band using a first frequency offset, the delta frequency offset, and a second delta frequency offset, wherein the second frequency offset is a product of the first frequency offset and a carrier frequency for a second band of communication divided by a carrier frequency for a first band of communication multiplied by a result of the second delta frequency offset divided by the first delta frequency offset; and
process one or more packets of information communicated on the second band of communication via the second transceiver based on the second frequency offset.

21. The at least one non-transitory computer-readable storage medium of claim 20, comprising instructions that when executed cause the processing circuitry to:
receive the second delta frequency offset for the other device on the first frequency band; and determine the first frequency offset between an apparatus and the other device for the first frequency band.

* * * * *